(12) United States Patent
Kresge et al.

(10) Patent No.: US 11,845,375 B1
(45) Date of Patent: *Dec. 19, 2023

(54) AUTOMATIC WHEEL GRID

(71) Applicant: Oshkosh Corporation, Oshkosh, WI (US)

(72) Inventors: Bradley S. Kresge, Hagerstown, MD (US); Todd Werner, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,202

(22) Filed: Jan. 4, 2023

Related U.S. Application Data

(63) Continuation of application No. 17/852,937, filed on Jun. 29, 2022, now Pat. No. 11,565,619.

(51) Int. Cl.
*B60P 3/12* (2006.01)

(52) U.S. Cl.
CPC .................................. *B60P 3/125* (2013.01)

(58) Field of Classification Search
CPC ...................................................... B60P 3/125
USPC ......................................................... 414/563
See application file for complete search history.

(56) References Cited

U.S. PATENT DOCUMENTS

| | | | | |
|---|---|---|---|---|
| 3,620,393 | A * | 11/1971 | Leslie | B60P 3/125 280/402 |
| 3,716,152 | A * | 2/1973 | Sloter | B60P 3/125 280/402 |
| 3,762,585 | A * | 10/1973 | Hobbs | B60P 3/125 280/495 |
| 4,010,858 | A * | 3/1977 | Mahnke, Jr. | B60S 9/22 267/140 |
| 4,323,328 | A * | 4/1982 | Walsh, III | B60P 3/127 280/402 |
| 4,564,207 | A * | 1/1986 | Russ | B60P 3/125 280/402 |
| 5,350,271 | A * | 9/1994 | Weller | B60P 3/125 280/402 |
| 5,628,609 | A * | 5/1997 | Nespor | F16B 7/105 280/402 |
| 5,692,871 | A * | 12/1997 | Nespor | B60P 3/125 294/197 |
| 6,315,515 | B1 * | 11/2001 | Young | B60P 3/125 414/427 |
| 7,556,468 | B2 | 7/2009 | Grata | |

FOREIGN PATENT DOCUMENTS

EP 2660102 A1 * 11/2013 .............. B60P 3/125

* cited by examiner

*Primary Examiner* — Mark C Hageman
(74) *Attorney, Agent, or Firm* — Foley & Lardner LLP

(57) ABSTRACT

A wheel grid includes a crossbar configured to be coupled to a boom of a tow vehicle and including a distal tip. The wheel grid further includes an L-arm rotatably coupled to the crossbar at a proximal end of the L-arm and configured to rotate from an engaged position to a stowed position. As the L-arm rotates from the engaged position to the stowed position, a distal portion of the L-arm intersects with a vertical line passing through the respective left or right distal tip of the crossbar. In the stowed position, the distal portion of the L-arm is positioned laterally inward relative to the distal tip of the crossbar.

19 Claims, 18 Drawing Sheets

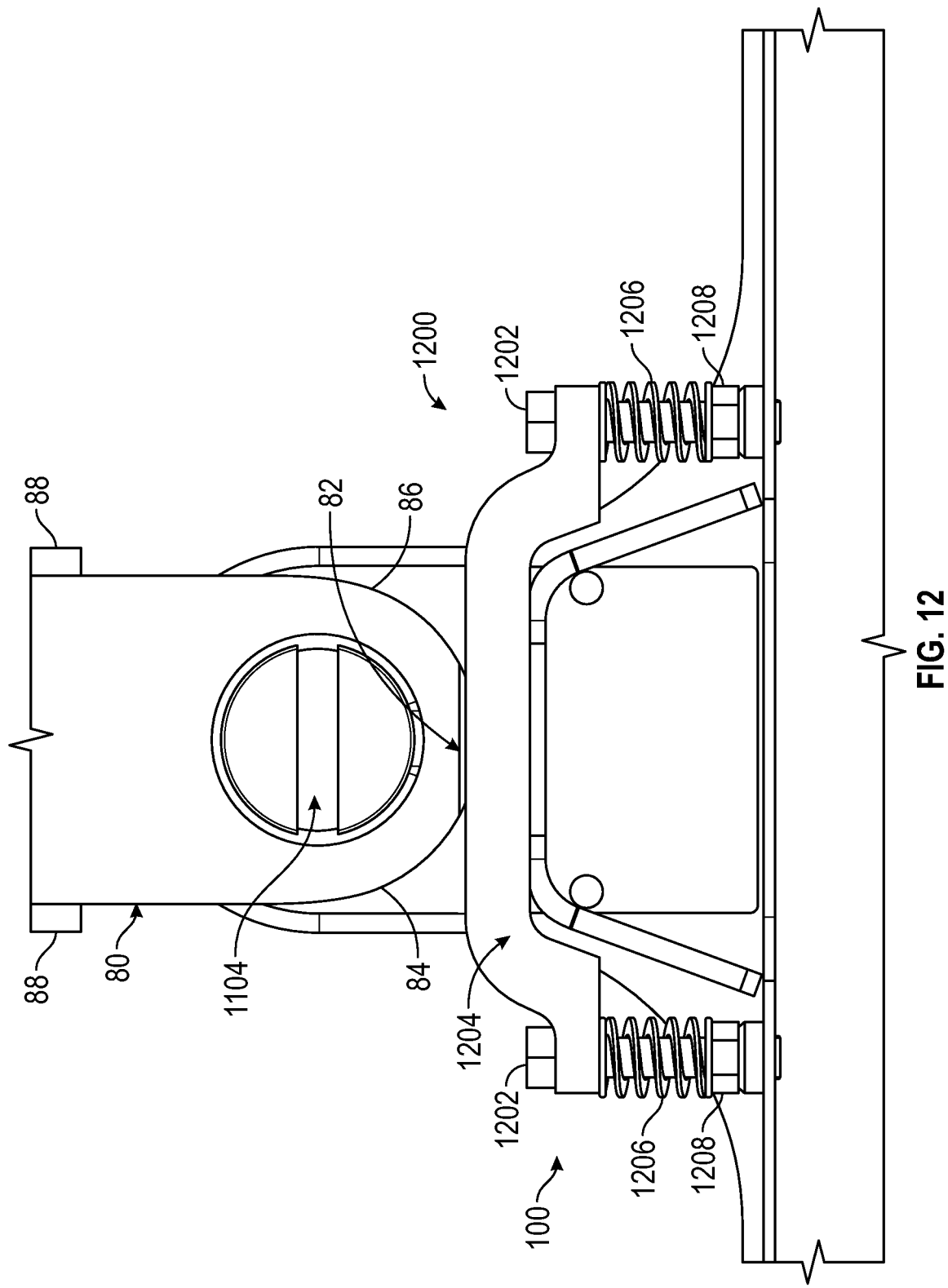

AUTOMATIC WHEEL GRID

BACKGROUND

This Application is a continuation of U.S. application Ser. No. 17/852,937, filed Jun. 29, 2022, which is hereby incorporated by reference herein in its entirety.

BACKGROUND

The present disclosure relates generally to vehicle towing. More specifically, the present disclosure relates to an automatic wheel grid capable of supporting a wide range of track widths and tire sizes.

SUMMARY

One embodiment relates to a wheel grid including a crossbar, a first L-arm, a second L-arm, a first crossbar end, and a second crossbar end. The crossbar is configured to be coupled to a main boom of a wheel lift tow vehicle. The first L-arm is rotatably coupled to the crossbar at a first pivot point and includes a first extension member and a first wheel brace member. The second L-arm is rotatably coupled to the crossbar at a second pivot point and includes a second extension member and a second wheel brace member. The first crossbar end is coupled to a first end of the crossbar and is configured to engage a first tire of a towed vehicle. The first crossbar end includes a first cantilevered portion. The second crossbar end is coupled to a second end of the crossbar and is configured to engage a second tire of the towed vehicle. The second crossbar end includes a second cantilevered portion. The first and second L-arms are configured to rotate into a stowed position in which the first wheel brace member is positioned under the first cantilevered portion and the second wheel brace member is positioned under the second cantilevered portion.

Another embodiment relates to a tow vehicle including a tow vehicle frame, a main boom coupled to the tow vehicle frame and extending rearward from the tow vehicle frame, and a wheel grid rotatably coupled to the main boom by a rotation pin. The wheel grid includes a crossbar configured to be coupled to the main boom, an L-arm rotatably coupled to the crossbar at a pivot point, the L-arm comprising an extension member and a wheel brace member, and a crossbar end coupled to an end of the crossbar and configured to engage a tire of a towed vehicle, the crossbar end comprising a cantilevered portion. The L-arm is configured to rotate into a stowed position in which the wheel brace member is positioned under the cantilevered portion.

Another embodiment relates to a tow vehicle including a tow vehicle frame, a main boom coupled to the tow vehicle frame and extending rearward from the tow vehicle frame, and a wheel grid rotatably coupled to the main boom by a rotation pin. The wheel grid is positionable in a neutral position in which a crossbar of the wheel grid is perpendicular to the main boom and rotatable at least 90 degrees clockwise and 90 degrees counterclockwise from the neutral position about the rotation pin.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 12 is a plan view of an interface between a main boom and the wheel grid of FIG. 1, according to an exemplary embodiment.

DETAILED DESCRIPTION

Figure 1:
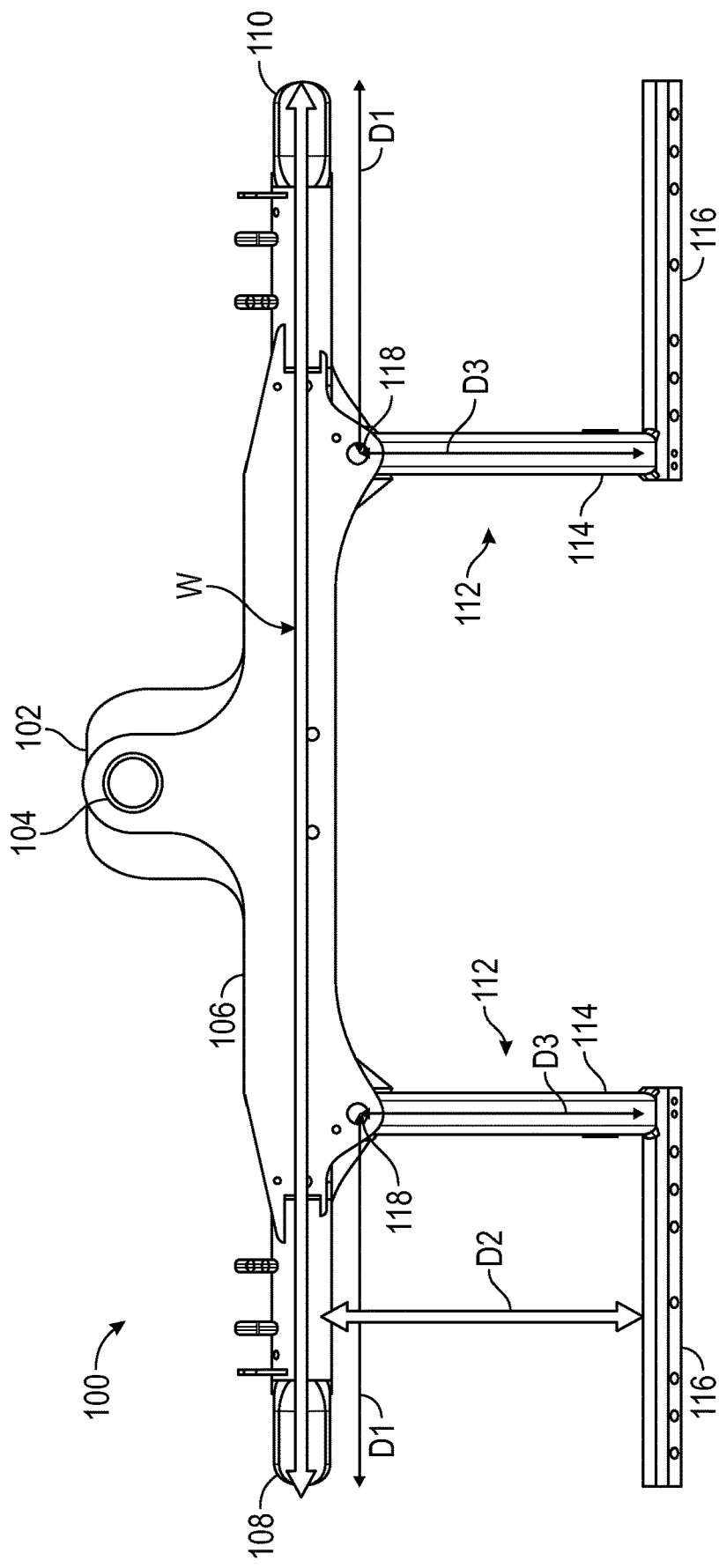
FIG. 1 is a plan view of a wheel grid, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

A wheel grid is a device that can be mounted to a tow vehicle to enable towing of another vehicle. The wheel grid is configured to lift the front or rear wheels of the towed vehicle off the ground by engaging the respective front or rear tires of the towed vehicle. This is generally preferable to using a hook to engage the frame of the vehicle, which may cause damage to the towed vehicle or may be more difficult due to the design of the towed vehicle. For the purpose of brevity, the remainder of the present disclosure will discuss wheel grids engaging with the front tires of towed vehicles. However, it should be understood that the embodiments disclosed herein may be used to tow a vehicle by lifting the rear wheels instead.

A wheel grid is generally mounted to a main boom coupled to and extending out from the rear of the tow vehicle. The wheel grid includes a main crossbar, which is generally fixed in position and engages the front sides of the front tires. The wheel grid may include two L-arms configured to rotate from a loading position, in which the L-arms can be inserted between the front wheels of the towed vehicle, to an engaged position, in which the L-arms engage the rear sides of the front tires. The boom then lifts the wheel grid, and the front tires of the towed vehicle are lifted off the ground by the crossbar and the L-arms. Some wheel grids are designed such that the L-arms can rotate into a third, stowed position when no vehicle is being towed. In the stowed position, the L-arms are tucked underneath the tow vehicle so they do not extend beyond the rear of the tow vehicle, creating a potential safety hazard.

An additional concern when designing wheel grids is the wide range of track widths (e.g., the distance between the two front tires) and tire sizes of various vehicles that may need to be towed. For example, compact sedans generally have narrower track widths and tire sizes than full-size pickup trucks. It is advantageous that a wheel grid is able to be used to tow a wide variety of vehicle types.

According to an exemplary embodiment, a wheel grid includes a crossbar configured to be coupled to a main boom of a wheel lift tow vehicle; two L-arms, each coupled to the crossbar at a respective pivot point and including an extension member and a wheel brace member; and a crossbar end coupled to each end of the crossbar and including a cantilevered portion, the crossbar ends each configured to engage a tire of a towed vehicle. The L-arms are configured to rotate into a stowed position in which each L arm is positioned under one of the cantilevered portions.

Figure 2:
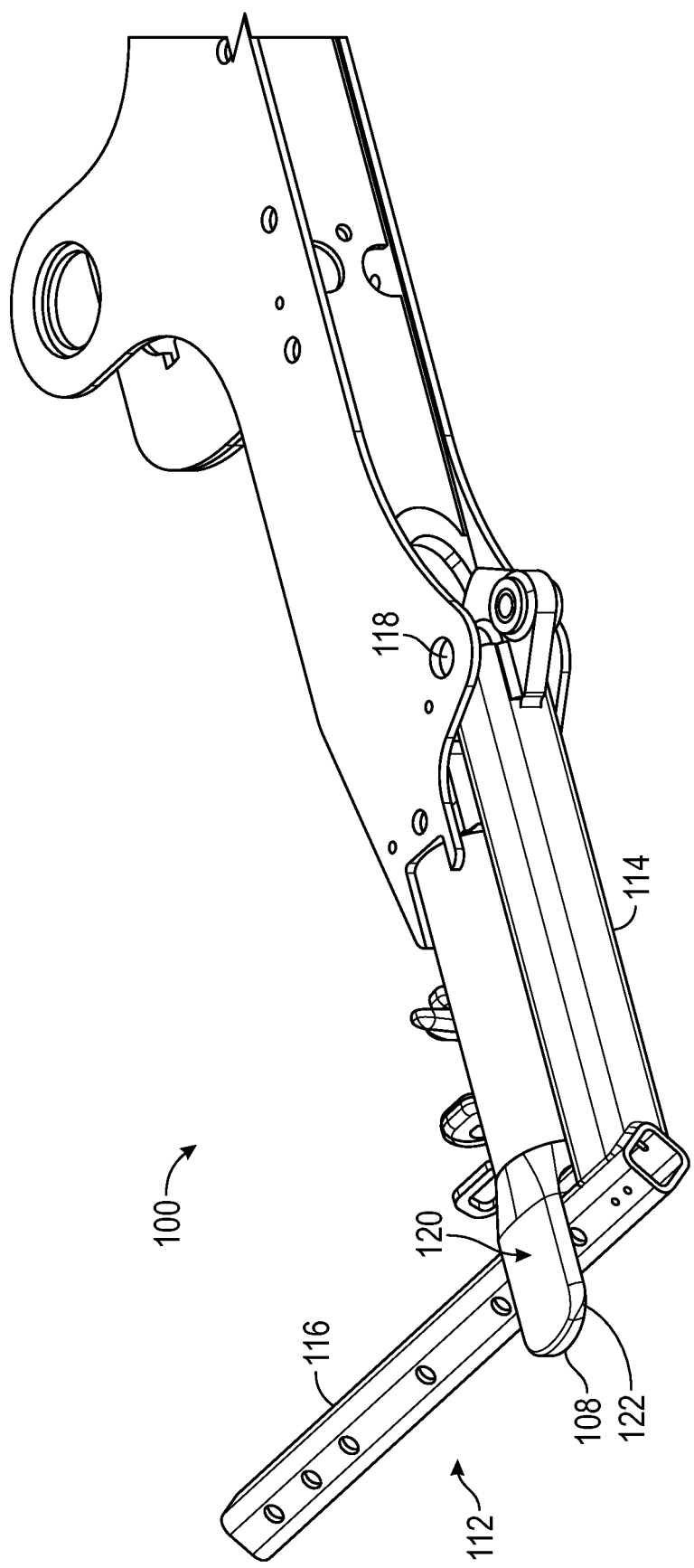
FIG. 2 is a perspective view the wheel grid of FIG. 1.

Referring now to FIGS. 1 and 2, a wheel grid 100 is shown, according to some embodiments. The wheel grid 100 includes a mounting bracket 102 including an opening 104. The opening 104 is configured to receive a pin such that the mounting bracket 102 can be rotatably coupled to a main boom of a tow truck by the pin. The mounting bracket 102 is coupled to a crossbar 106 that extends from a left end 108 to a right end 110. The wheel grid 100 includes two L-arms 112 for engaging the front tires of a towed vehicle. Each L-arm 112 includes an extension member 114 coupled to a wheel brace member 116. The wheel brace member 116 may be substantially straight and substantially perpendicular to the extension member 114. The L-arms 112 are rotatably coupled to the crossbar 106 at rotation points 118 (e.g., pivot points, etc.). Specifically, a proximal end of the extension member 114 is coupled to the rotation point 118 and a distal end of the extension member 114 is coupled to a proximal end of the wheel brace member 116. In FIG. 1, the wheel grid 100 is shown in an engaged position, in which the wheel grid 100 may be engaged with the tires of a towed vehicle. The crossbar 106 engages the front of the front tires of the towed vehicle, the extension members 114 extend rearward between the front tires, and the wheel brace members 116 engage the rear of the front tires. The distance from the left end 108 to the right end 110 is shown as width W. The distance from the crossbar 106 to the wheel brace members 116 is shown as distance D2.

FIG. 2 shows the wheel grid 100 in a stowed position, in which the L-arms 112 rotate approximately 90 degrees from the engaged position such that the extension members 114 are substantially parallel and adjacent to the crossbar 106 and the wheel brace members 116 extend forward underneath the tow vehicle in a direction substantially perpendicular to the crossbar 106. In conventional wheel grids, the distance from the rotation point 118 to the wheel brace member 116, shown as distance D3, may be greater than the distance from the rotation point 118 to the end 108 of the crossbar 106, shown as distance D1. In these conventional wheel grids, when the L-arms 112 rotate into the stowed position, the wheel brace members 116 may be positioned further from the center of the wheel grid 100 than the end 108 of the crossbar 106. This allows the L-arms 112 to rotate into the stowed position without the crossbar 106 interfering. However, in order to tow a wide range of vehicles, it may be advantageous to reduce the distance D2 so that the wheel grid can be used to tow vehicles with smaller tires. It is also advantageous to increase the distance D1, and more specifically, the width W of the crossbar 106, so that vehicles with wider track widths can also be towed. In order to increase the width W while decreasing the distance D1 (thereby reducing the distance D3), the wheel grid 100 includes a crossbar end 120 at either end of the crossbar 106. The crossbar end 120 includes a cantilevered portion 122 that allows the wheel brace members 116 to rotate under the ends 108, 110 of the crossbar 106. Thus, according to some embodiments, the wheel grid 100 has a distance D3 from the rotation point 118 to the wheel brace member 116 that is shorter than the distance D1 from the rotation point 118 to the end 108 of the crossbar 106.

Figure 3A:
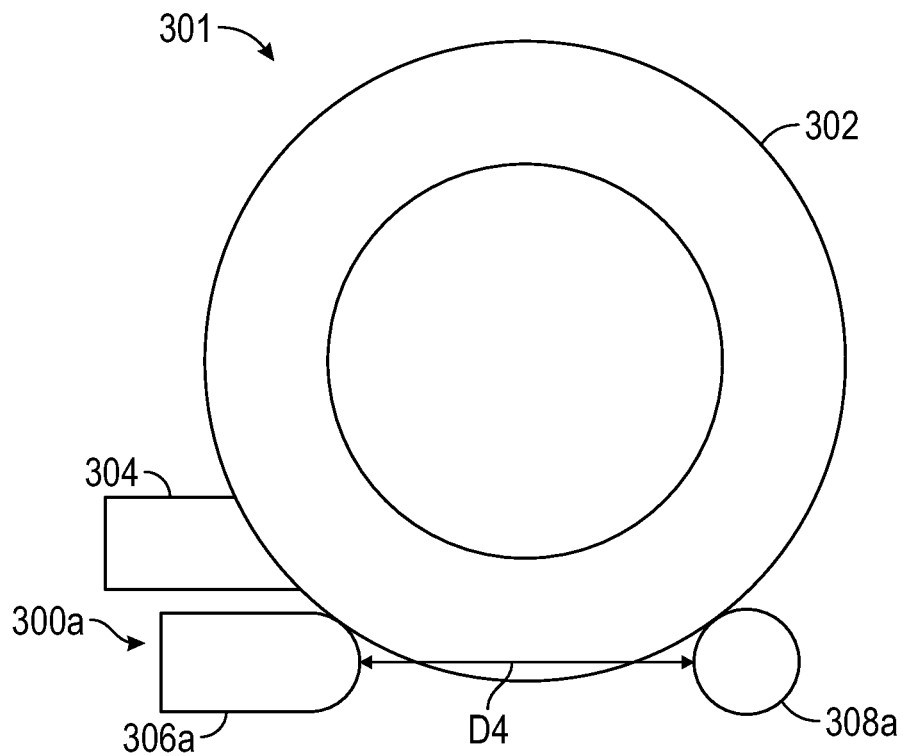
FIGS. 3A and 3B are side view diagrams of a tire being engaged by a wheel grid.
Figure 3B:
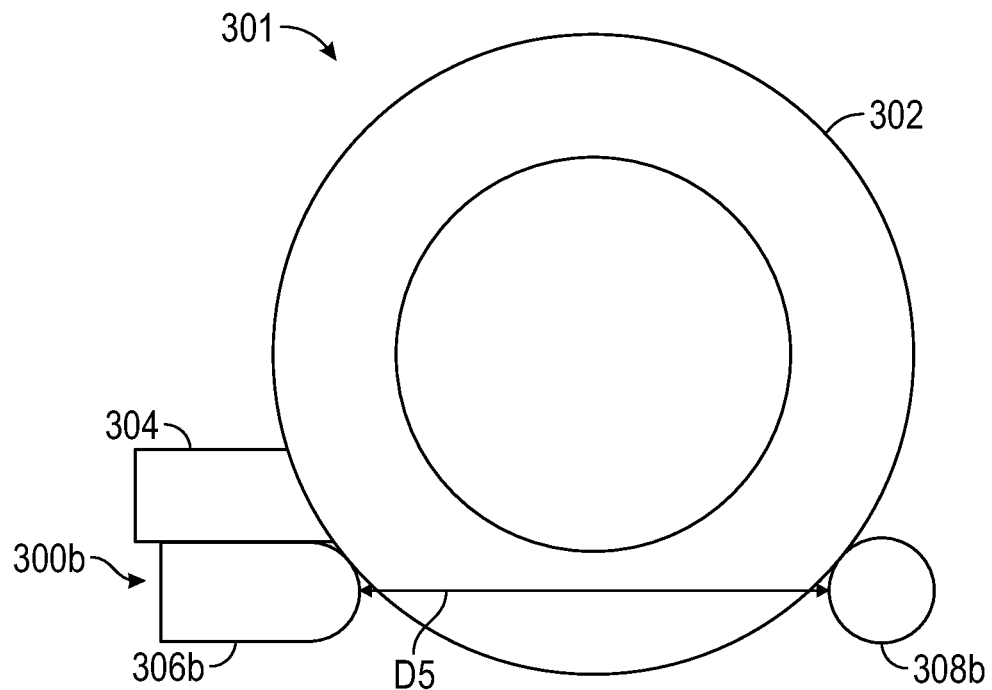
Figure 4:
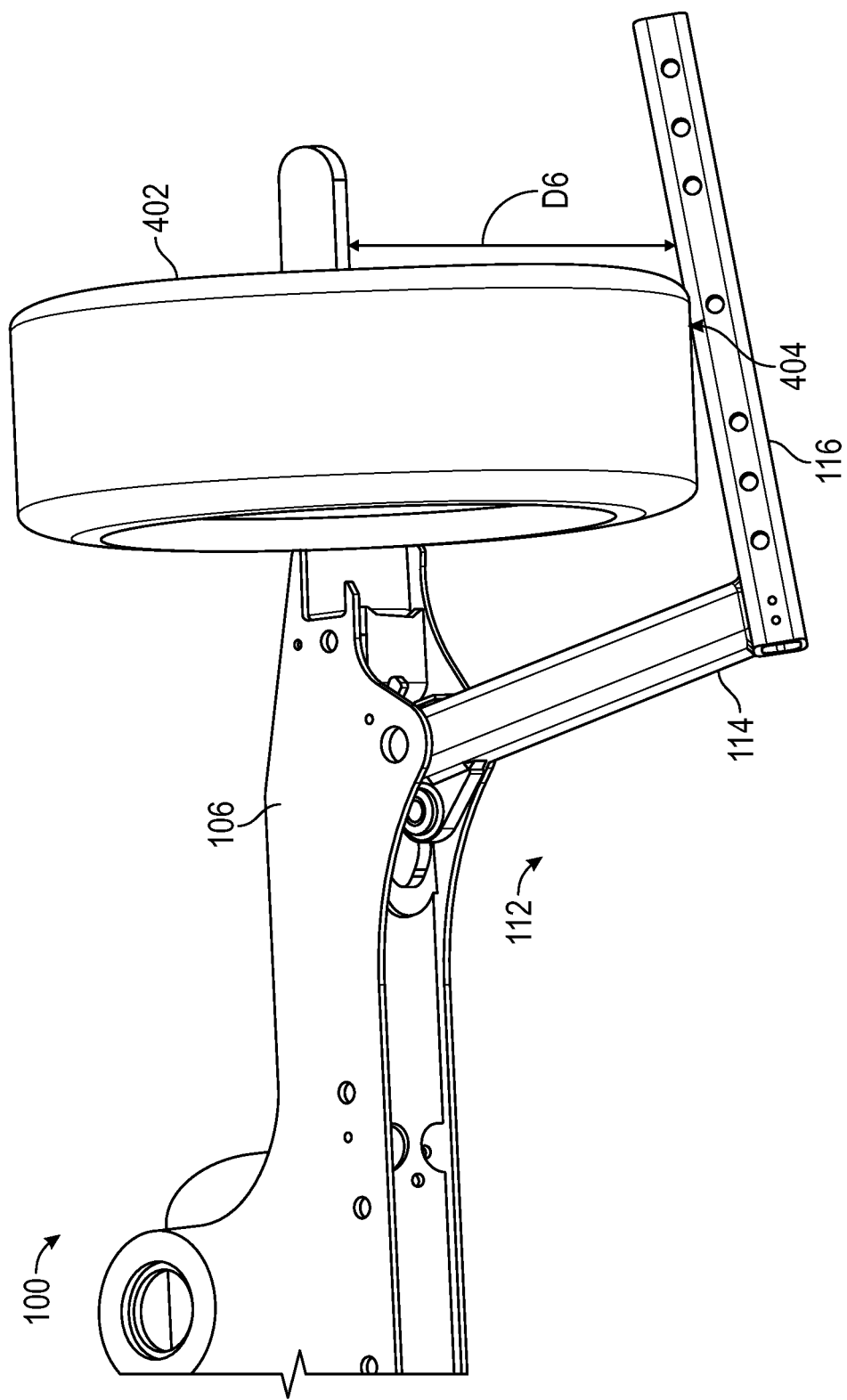
FIG. 4 is a perspective view the wheel grid of FIG. 1 engaging a tire.

Referring now to FIGS. 3A and 3B, partial cross section views of two wheel grids 300a, 300b are shown engaging a towed vehicle 301, according to some embodiments. The wheel grid 300a includes a crossbar 306a that is a distance D4 away from a wheel brace member 308a. The wheel grid 300b includes a crossbar 306b that is a distance D5 away from a wheel brace member 308b. Distance D5 is greater than distance D4. When wheel grid 300a engages the tire 302 of the towed vehicle 300, the tire 302 sits high enough that there is clearance between the crossbar 306a and the oil pan 304 and other components of the undercarriage of the towed vehicle 301. However, because the distance D5 between the crossbar 306b and the wheel brace member 308b of the wheel grid 300b is larger, the tire 302 sits lower on the wheel grid 300b and the crossbar 306b may contact and damage the oil pan 304 and other components of the undercarriage of the towed vehicle 301. FIG. 4 shows a wheel grid 100 with an L-arm 112 that is over-rotated such that the wheel brace member 116 contacts the tire 402 of a towed vehicle at a contact point 404 near the outside of the tire 402. It should be understood that "over-rotated" refers to the rotation of the l-arm 112 such that the extension member 114 and the crossbar 106 form an angle greater than 90 degrees. The contact point 404 is a distance D6 from the crossbar 106, which is shorter than the length of the extension member 114 due to the over-rotation of the L-arm 412. This may be necessary to tow vehicles with smaller tires 402. The longer the extension member 114, the more the L-arm 112 must over-rotate to contact the tire 402 at an acceptable distance D6. If the extension member 114 is too long, the wheel brace member 116 may contact the tire 402 at a contact point 404 that is too close to the sidewall of the tire 402 or the extension member 114 may contact the sidewall of the tire 402, either of which can damage the tire 402.

Figure 5:
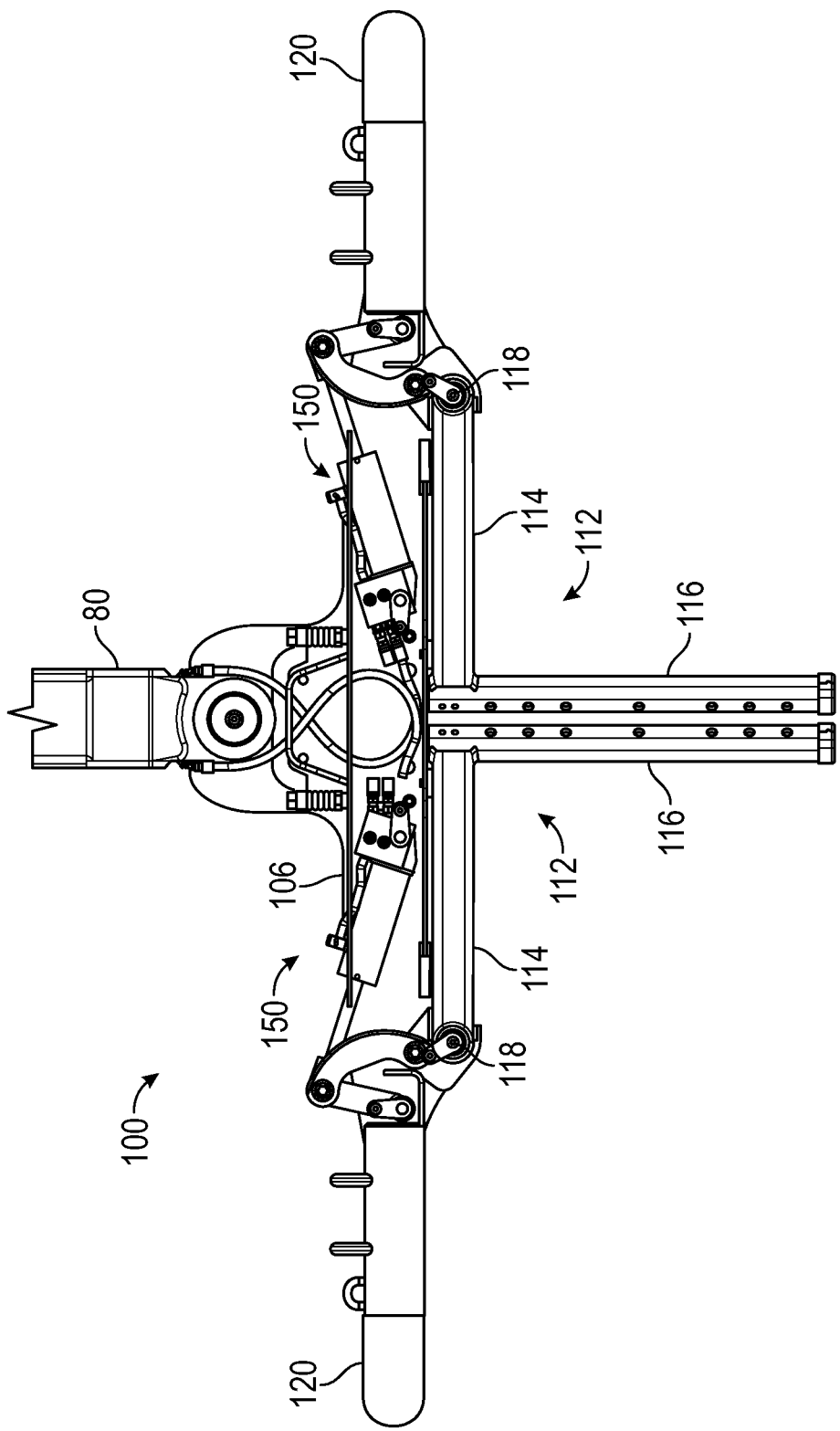
FIG. 5 is a plan view of the wheel grid of FIG. 1 in a loading position.
Figure 6:
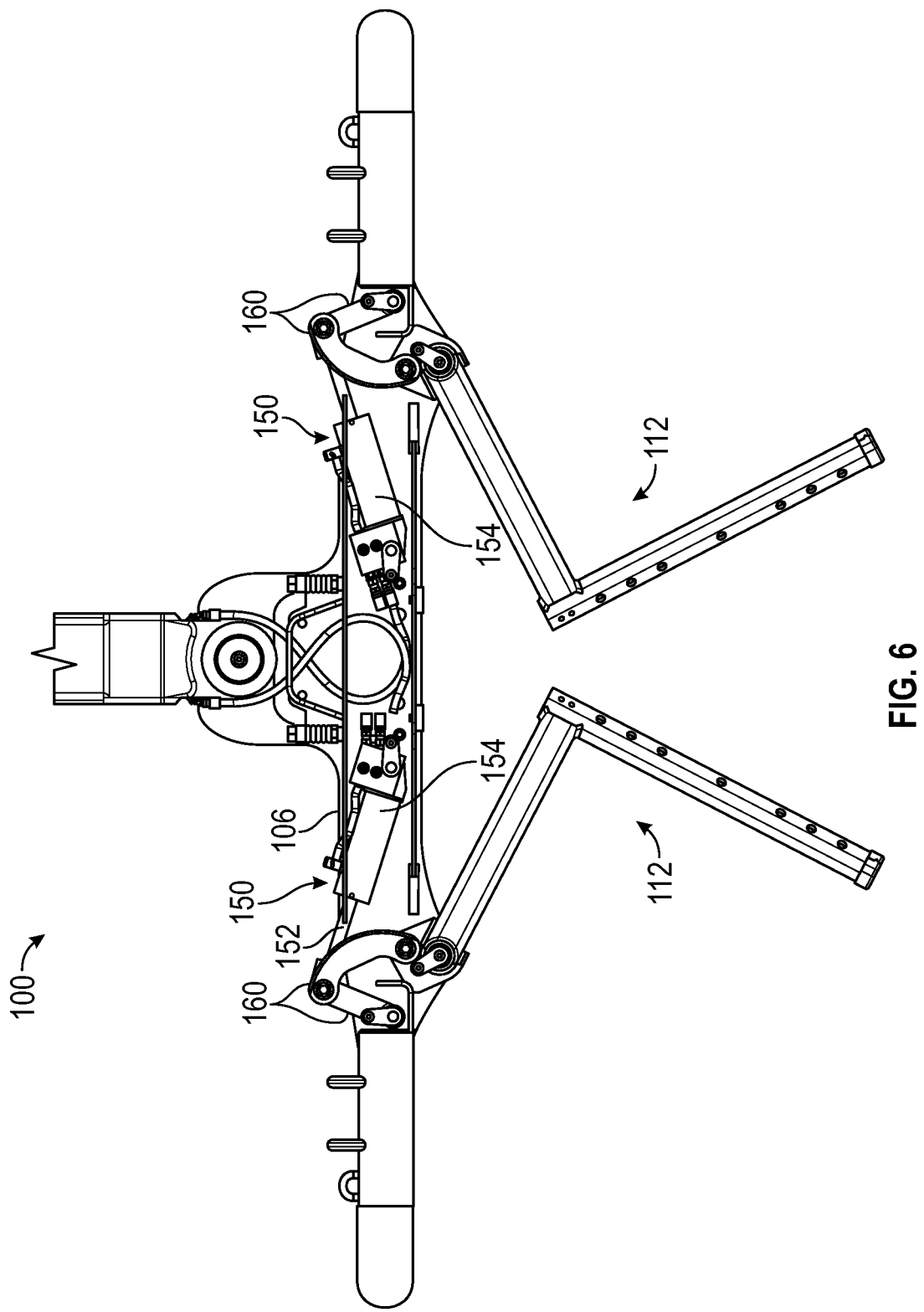
FIG. 6 is a plan view of the wheel grid of FIG. 1 transitioning from a loading position to an engaged position.

FIGS. 5-11 illustrate the wheel grid 100 with the L-arms 112 rotated into various operational positions, according to some embodiments. The wheel grid 100 is coupled to a boom 80, which may be coupled to and extend rearward from a tow vehicle. FIG. 5 shows the wheel grid 100 in the loading position, with the wheel brace members 116 are perpendicular to the crossbar 106 and extending rearward and the extension members 114 parallel and adjacent to the crossbar 106. To engage a vehicle to be towed, the tow vehicle backs up towards the towed vehicle and the wheel brace members 116 are inserted between the front wheels of the towed vehicle until the crossbar 106 contacts the towed vehicle. Linear actuators 150 are configured to rotate the L-arms 112 to move them between the loading, engaged, and stowed positions. FIG. 6 shows the wheel grid 100 with the L-arms 112 in transition between the loading position and the engaged position. The rods 152 of the linear actuators 150 retract into the cylinders 154, rotating the linkages 160 causing the L-arms 112 to rotate. The linear actuators 150 may be, for example, electromechanical actuators, pneumatic actuators, or hydraulic actuators that may be controlled via user input. In some embodiments, other actuators or configurations may be used to cause the rotation of the L-arms 112. The arrangement of the linkages 160 allows the linear actuators 150 to be substantially within the footprint of the crossbar 106 and enable at least 180-degree rotation of the L-arms 112 from the stowed position to the loading position. This, combined with the positioning of the rotation points 118, allows the extension members 114 to be substantially parallel and directly adjacent to the crossbar 106 when in the loading position. When in the loading position, the wheel brace member 116 may be substantially parallel and directly adjacent to one another. This may allow the wheel brace members 116 to more easily fit between the tires of the towed vehicle, particularly when the towed vehicle must be engaged by the wheel grid 100 at an angle.

Figure 7:
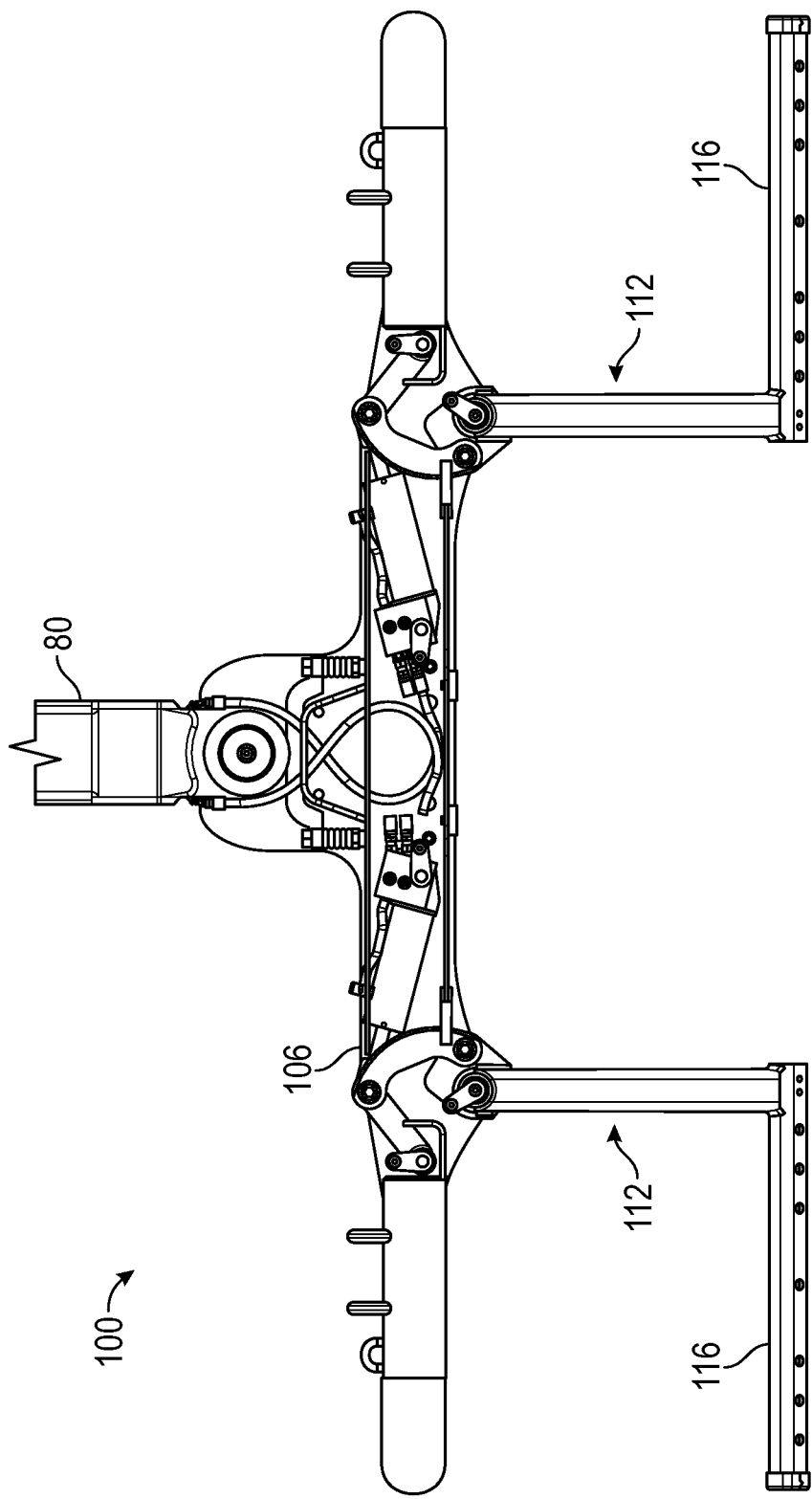
FIG. 7 is a plan view of the wheel grid of FIG. 1 in an engaged position.
Figure 8:
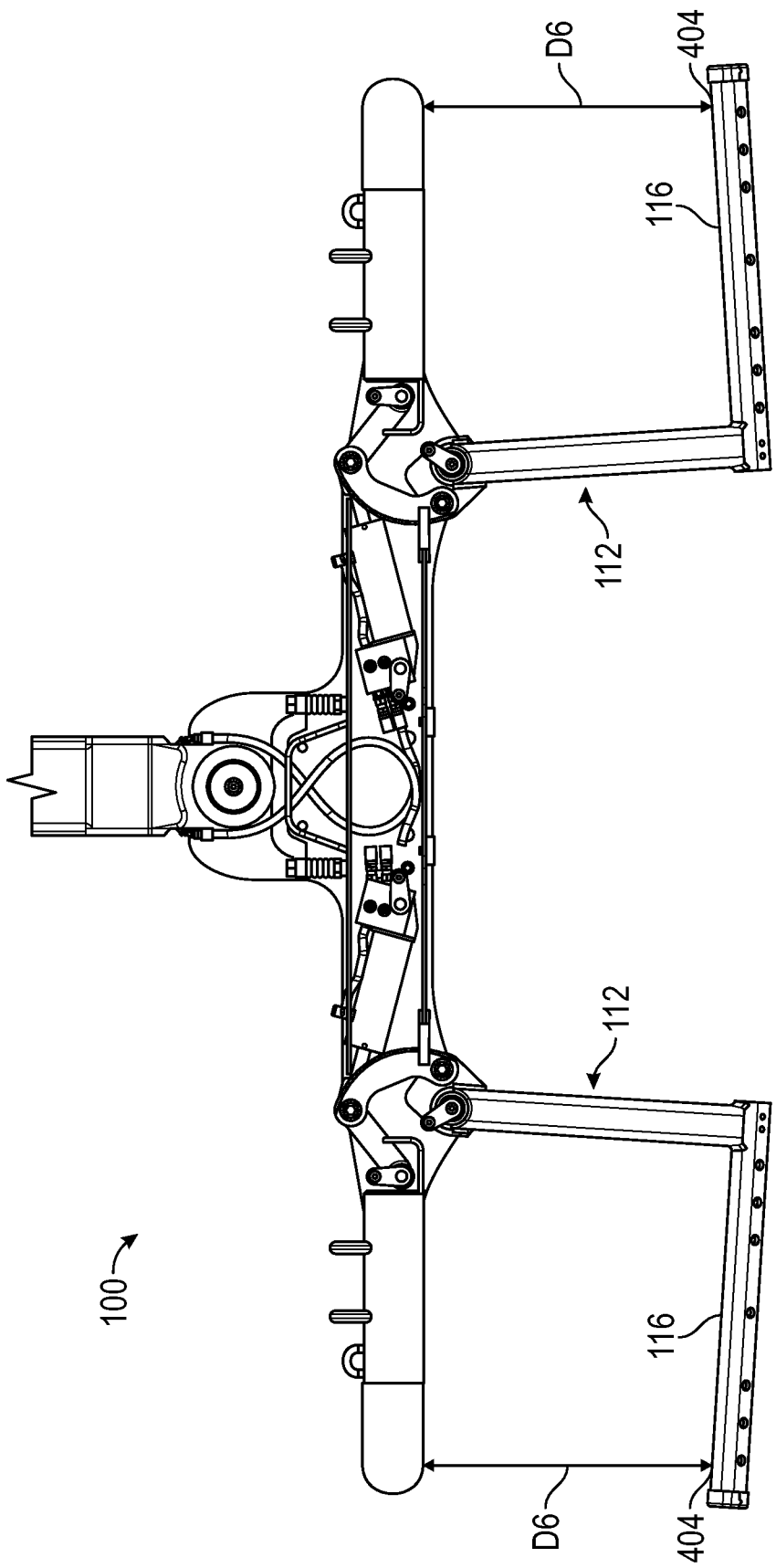
FIG. 8 is a plan view of the wheel grid of FIG. 1 in an over-rotated engaged position.
Figure 9:
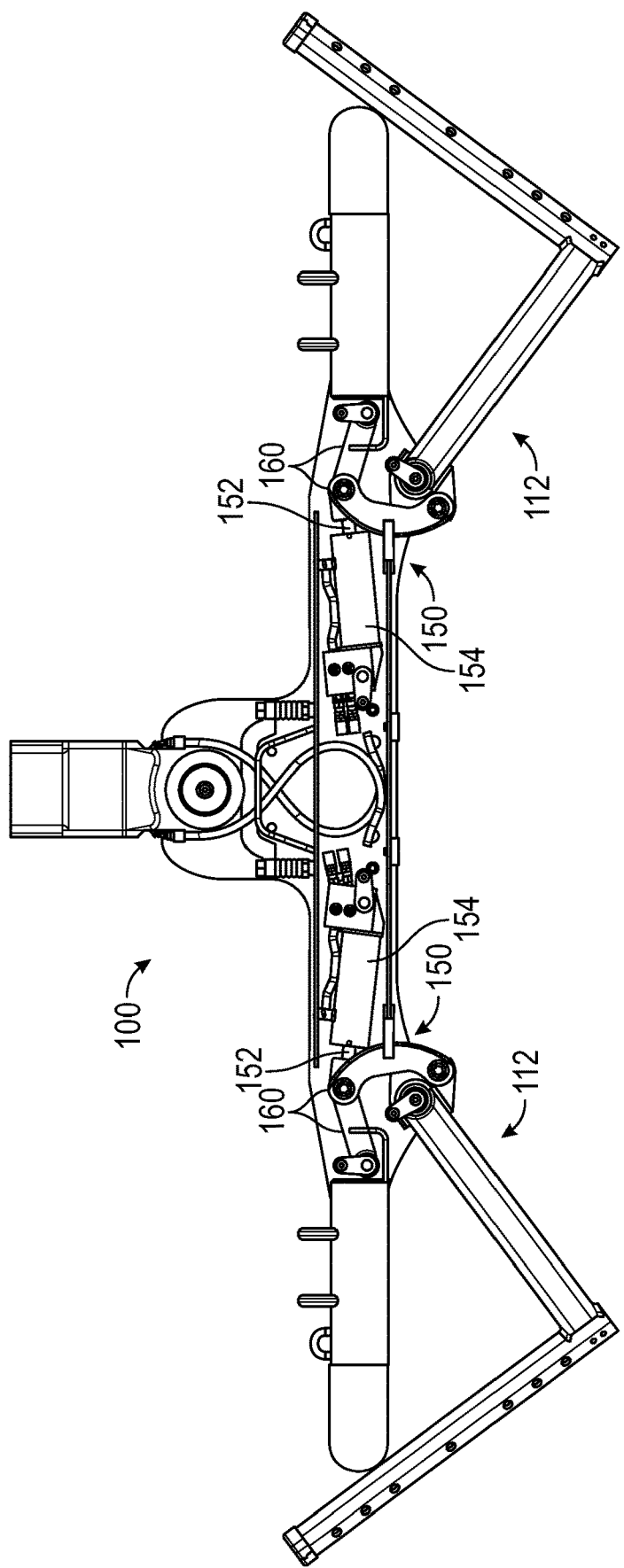
FIG. 9 is a plan view of the wheel grid of FIG. 1 transitioning from an engaged position to a stowed position.

FIG. 7 shows the wheel grid 100 with the L-arms 112 rotated into an engaged position such that the wheel brace members 116 are roughly parallel to the crossbar 106. The wheel brace members 116 may engage the rear side of the front tires of the towed vehicle. The boom 80 can then lift the wheel grid 100 causing the crossbar 106 and the wheel brace members 116 to lift the front of the towed vehicle by engaging the front tires. It should be understood that one or more of the crossbar 106 or the wheel brace members 116 may not contact the tire until the wheel grid 100 is partially lifted. FIG. 8 shows the wheel grid 100 in an over-rotated engaged position. As discussed above, for towing vehicles with smaller tires, a small amount of over-rotation may be necessary to reduce the distance D6 from the crossbar 106 to the contact point 404 of the tire on the wheel brace member 116. FIG. 9 shows the wheel grid 100 with the L-arms 112 in transition between an engaged position and a stowed position. The rods 152 of the linear actuators 150 continue to retract into the cylinders 154, rotating the linkages 160 causing the L-arms 112 to rotate further.

Figure 10:
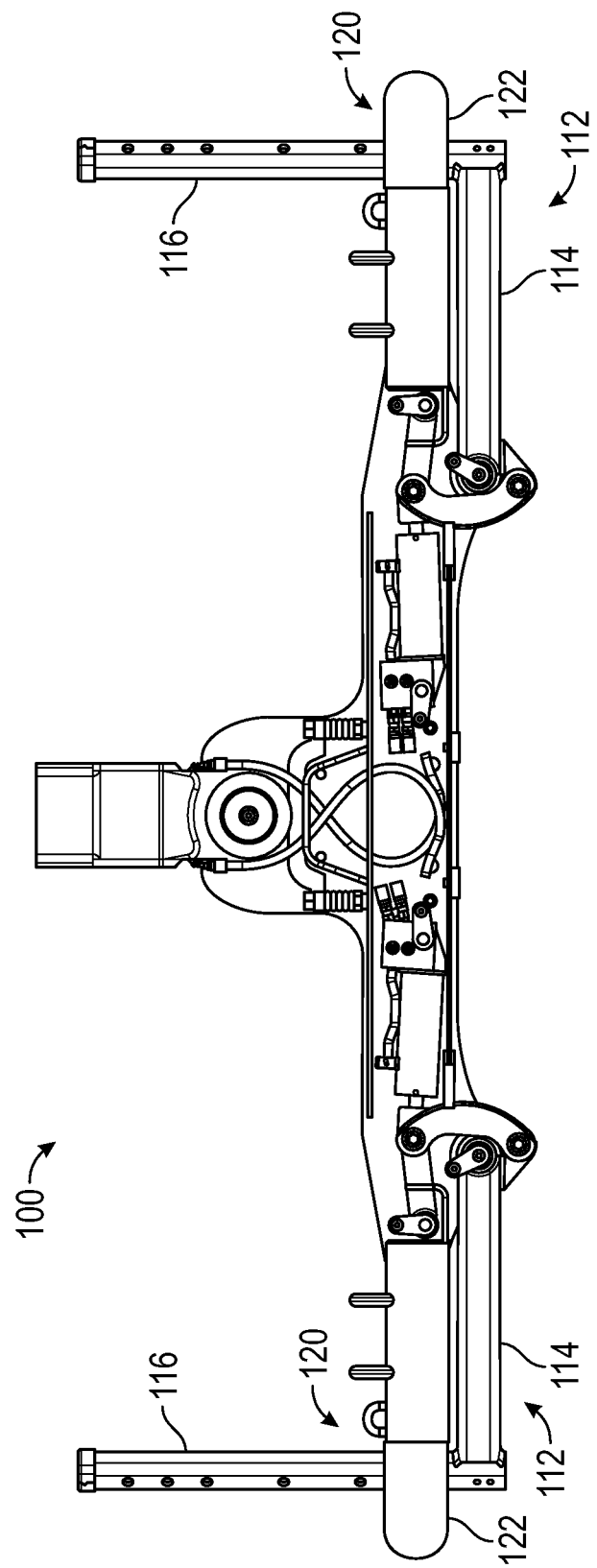
FIG. 10 is a plan view of the wheel grid of FIG. 1 in a stowed position.

FIG. 10 shows the wheel grid 100 with the L-arms 112 in a stowed position such that the extension members 114 are adjacent the crossbar 106 and the wheel brace members 116 extend forward toward the tow vehicle. The wheel brace members 116 pass under the cantilevered portions 122 of the crossbar ends 120. As discussed above, this allows the distance D3 from the crossbar 106 to the wheel brace members 116 to be reduced while maintaining the width W of the crossbar 106. Because the wheel brace members 116 pass under the cantilevered portions 122 of the crossbar ends 120, the crossbar 106 does not interfere with the rotation of the L-arms 112 into the stowed position.

Figure 11A:
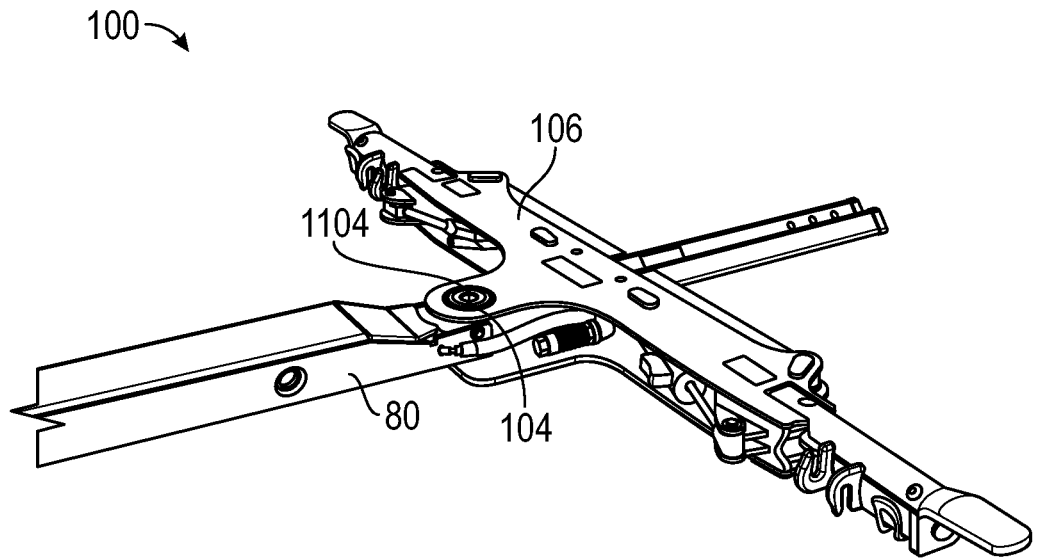
FIGS. 11A and 11B are perspective views of the wheel grid of FIG. 1.
Figure 11B:
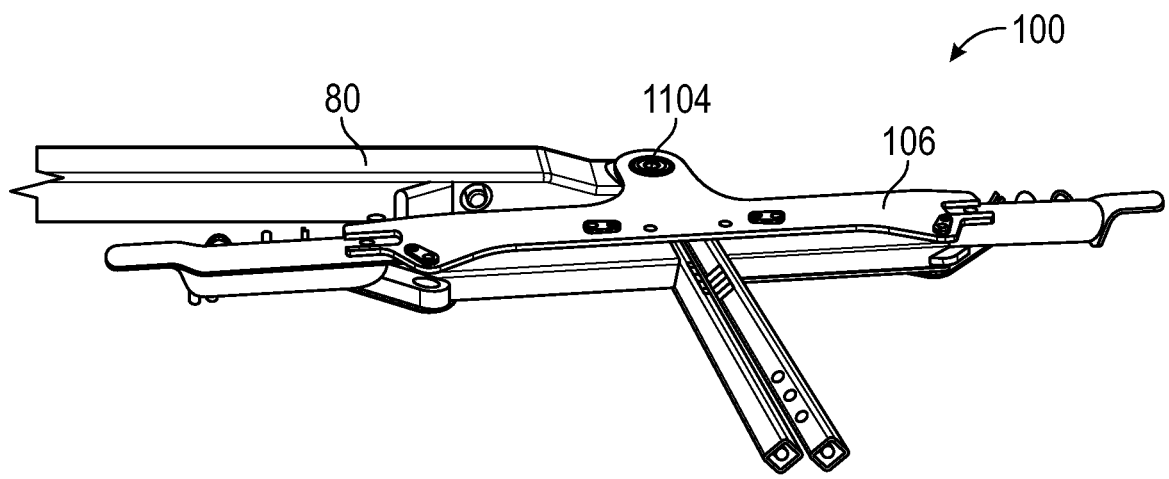

FIGS. 11A and 11B show the wheel grid 100 rotated zero degrees and ninety degrees, respectively, about a rotation pin 1104 inserted into the opening 104 in the mounting bracket 102, according to some embodiments The rotation pin 1104 rotatable couples the wheel grid 100 to the main boom 80 to allow the tow vehicle to engage the tires of a towed vehicle from an angle. For example, it may not be possible to load a car parallel parked between two other cars with the crossbar 106 in a static position perpendicular to the main boom 80. Rotation of the wheel grid 100 allows the towed car to be engaged and pulled out of the parking spot at an angle. In some embodiments, the wheel grid 100 may be inserted under the center of a parallel-parked vehicle from the side, and the crossbar 106 may engage the rear of the front tires while the wheel brace members 116 engage the front of the front tires. The towed vehicle can be pulled out of the parking spot, set back down, and reengaged from the front to be towed away. In some embodiments, the rotation of the wheel grid 100 relative to the main boom 80 may be actuated (e.g., electrically, hydraulically, or pneumatically actuated). In some embodiments, the wheel grid 100 rotates when it comes in contact with a tire of a towed vehicle. The tire pushes the wheel grid 100 left or right causing the rotation as the tow vehicle backs toward the towed vehicle. The wheel grid 100 may be able to rotate at least 90 degrees in either direction (clockwise or counterclockwise) from the neutral position in which the crossbar 106 is perpendicular to the main boom 80.

Figure 13:
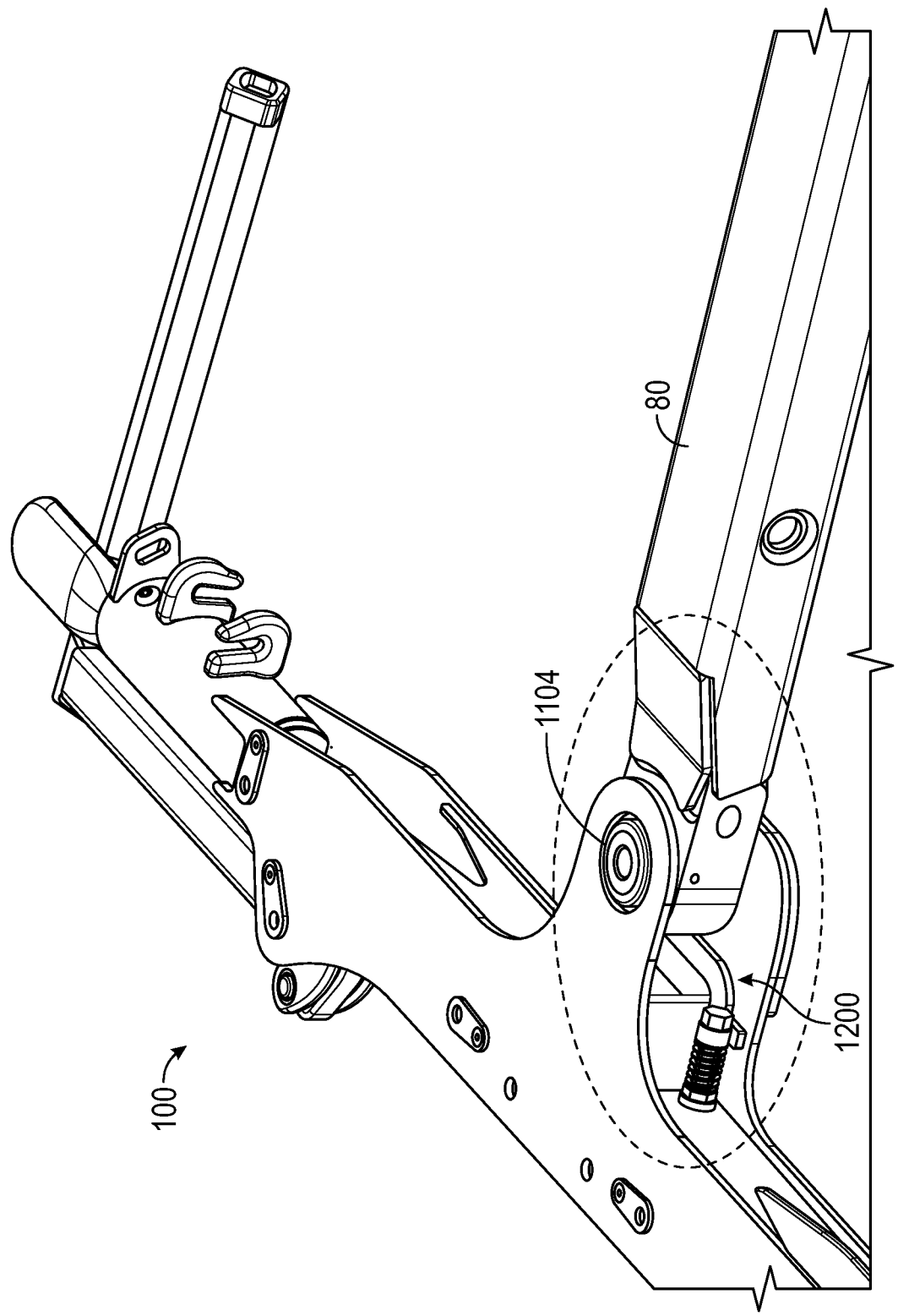
FIG. 13 is a perspective view of the interface of FIG. 12.

FIG. 12 shows a detent assembly 1200 that resists the rotation of the wheel grid 100 relative to the main boom 80, according to some embodiments. The detent assembly 1201 may be mounted to the crossbar 106 by two fasteners 1202 (e.g., threaded fasteners, screws, shoulder screws, etc.). The fasteners 1202 each extend through a respective clearance hole in a detent bracket 1204, such that the detent bracket 1204 is slidably coupled (e.g., not threadedly coupled) to the fasteners 1202. A spring 1206 is positioned around each of the fasteners 1202 and biases the detent bracket 1204 toward the main boom 80. The fasteners 1202 may be threadedly coupled to the crossbar 106, and a locknut 1208 may be threadedly coupled to each fastener 1202 to hold the fastener 1202 in position relative to the crossbar 106. When the wheel grid 100 is in the neutral position (e.g., when the crossbar 106 is perpendicular to the main boom 80), the springs 1206 bias the detent bracket 1204 such that the detent bracket 1204 engages a detent flat 82 in the main boom 80. This configuration resists the rotation of the wheel grid 100 until a rotational force on the wheel grid 100 overcomes the force of the detent assembly 1100. The towed vehicle may thus be kept substantially in line with the tow vehicle unless a relatively strong rotational force overcomes the force of the detent assembly 1100. The detent assembly 1201 may also prevent or resist the rotation of the wheel grid 100 when the wheel grid 100 is in the stowed position to stop the wheel grid 100 from swinging and potentially contacting the rear wheels or other components of the tow vehicle. The main boom 80 includes a left portion 84 and a right portion 86, each with a circular profile, which the detent bracket 1204 contacts when the wheel grid 100 is rotated out of the neutral position. FIG. 13 shows a perspective view of the detent assembly 1200.

In some embodiments, the main boom 80 may include stops 88 to limit the overall rotation of the wheel grid 100 in either direction. The stops 88 may be positioned such that the heads of the fasteners 1202 contact the stops. Fine control of the maximum amount of rotation of the wheel grid 100 can be achieved by adjusting the extension of the fasteners 1202 away from the crossbar 106. For example, the fasteners 1202 can be loosened such that the heads of the fasteners 1202 are farther from the crossbar 106. The heads of the fasteners 1202 will then contact the stops 88 on the main boom 80 at a lower amount of rotation. Conversely, the fasteners 1202 can be tightened such that the heads of the fasteners 1202 are closer to the crossbar 106, and the wheel grid 100 will be able to rotate further before the fasteners 1202 contact the stops 88.

Figure 14:
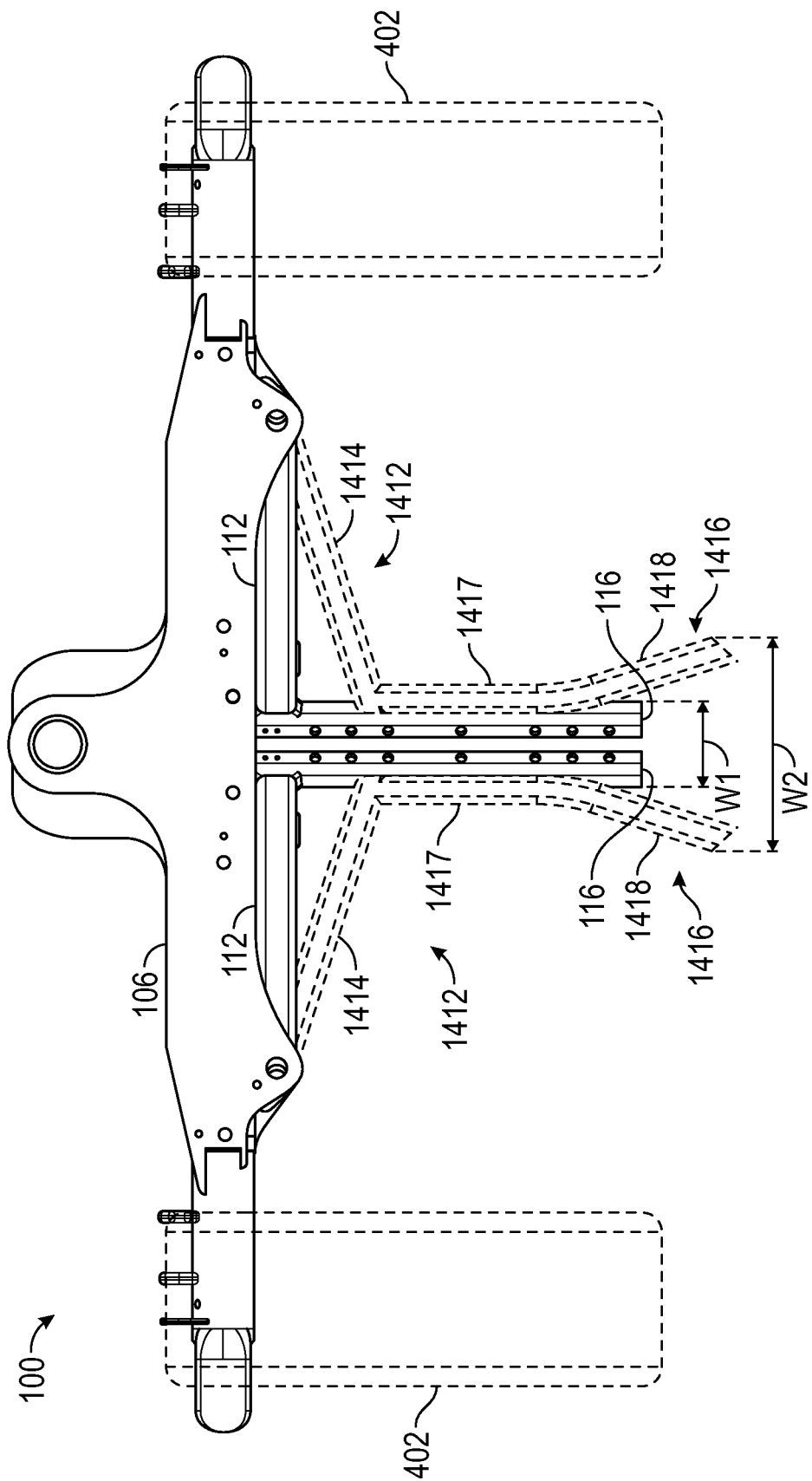
FIGS. 14-16 are plan views of the wheel grid of FIG. 1 with overlaid alternative shaped L-arms.
Figure 15:
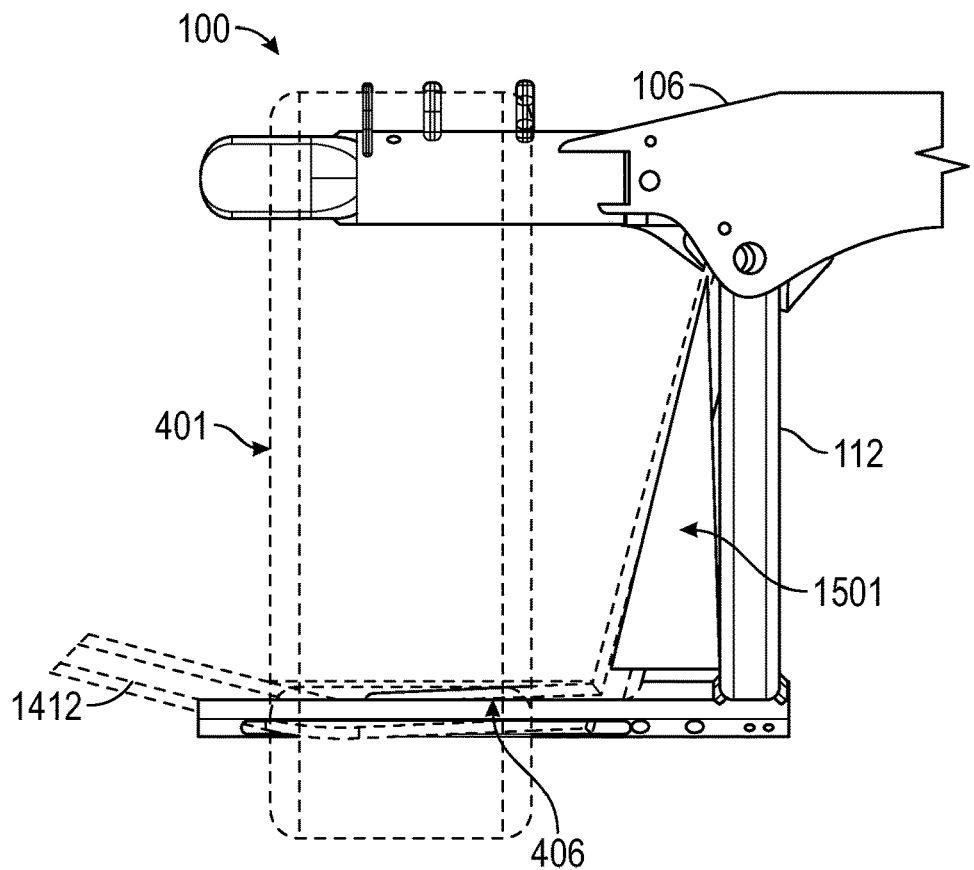
Figure 16:
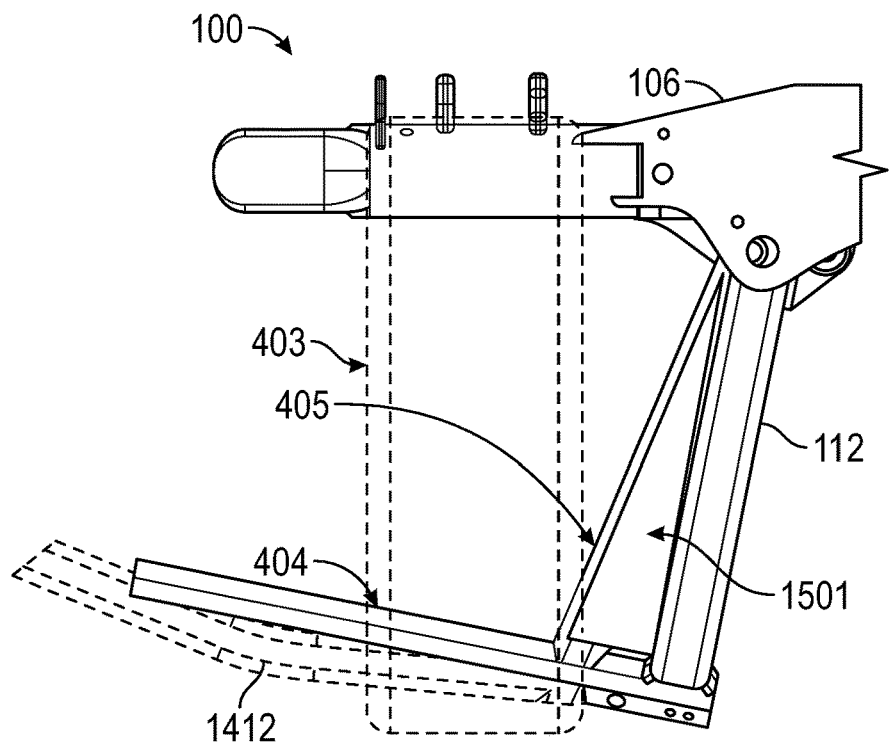

FIGS. 14-16 show the wheel grid 100 with overlaid alternatively shaped L-arms 1412, to emphasize the advantages of the shape of the L-arms 112. The L-arms 1412 are designed with extension members 1414 that are not able to rotate into a parallel and adjacent position relative to the crossbar 106. The L-arms 1412 may also include wheel brace members 1416 that have a straight portion 1417 and an angled end 1418. The angled ends 1418 cause the combined width W2 of the wheel brace members 1416 in the loading position to be larger than the width W1 is the combined wheel brace members 116 in the loading position. This makes it more difficult to fit the wheel brace member 1416 between the tires of the towed vehicle. FIGS. 15 and 16 show the wheel grid 100 and the alternatively shaped L-arms 1412 in a loading position engaging a large tire 401 and an over-rotated loading position engaging a small tire 403, respectively. As shown in FIG. 15, because the straight portion 1417 of the wheel brace member 1416 is not perpendicular to the extension member 1414, an area 1501 of interference is created. When engaging a towed vehicle with large tires 401, the area 1501 requires that the wheel grid is more centered on the towed vehicle. If the wheel grid is not centered, the straight portion 1417 of the wheel brace member 1416 can contact the sidewall of the tire 401. As shown in FIG. 16, when towing a vehicle with small tires 403, the straight portion 1417 of the wheel brace member 1416 may contact the sidewall of the tire 403 at a contact point 405 rather than making contact at the back of the tire at contact point 404. To avoid contact at the contact point 405, the L-arms 1412 cannot over-rotate as much as the L-arms 112, which causes a towed vehicle with small tires 403 to drop lower into the wheel grid, potentially causing contact between the wheel grid and the undercarriage of the towed vehicle. Thus, in the case of a small tire 403 or a large tire 401, the L-arms 112 provide advantages over the alternatively designed L-arms 1412.

Crossbar Belting

In certain situations, it may be difficult or impossible to tow a vehicle by engaging the tires with a wheel grid (e.g., wheel grid 100). For example, if the tires of the towed vehicle are damaged or the wheels or tires are removed, the crossbar and L-arms may not be able to properly engage and lift the vehicle. Instead, one or more chains coupled to the crossbar may be used to lift the vehicle. The tow vehicle may back toward the towed vehicle until the crossbar is approximately aligned with the front bumper of the towed vehicle. Then, a chain may be coupled to a hook on one side of the crossbar, coupled to the axle of the towed vehicle, and then coupled to a hook on the other side of the crossbar. Alternatively, a separate chain may be coupled to each side of the crossbar and the axle. When the wheel grid is lifted, the chains lift the vehicle and the crossbar contacts or nearly contacts the front bumper. In this towing arrangement, the crossbar may cause damage to the bumper if there is no protection in place between the bumper and the crossbar, which is generally made of metal, such as steel or aluminum.

Figure 17:
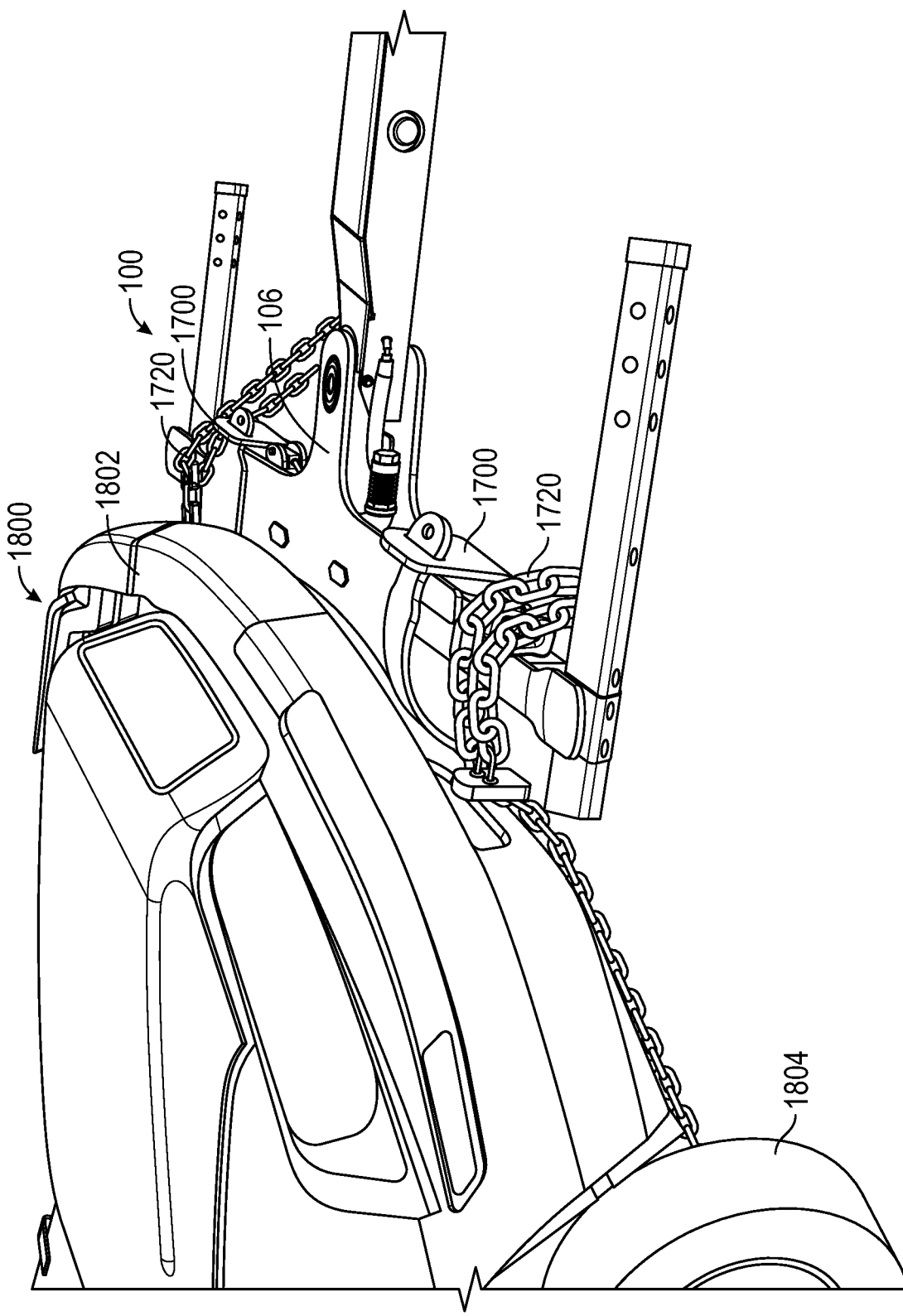
FIG. 17 is a perspective view of the wheel grid of FIG. 1 lifting a vehicle with chains, including protective belts positioned between the vehicle bumper and the wheel grid, according to an exemplary embodiment.
Figure 18:
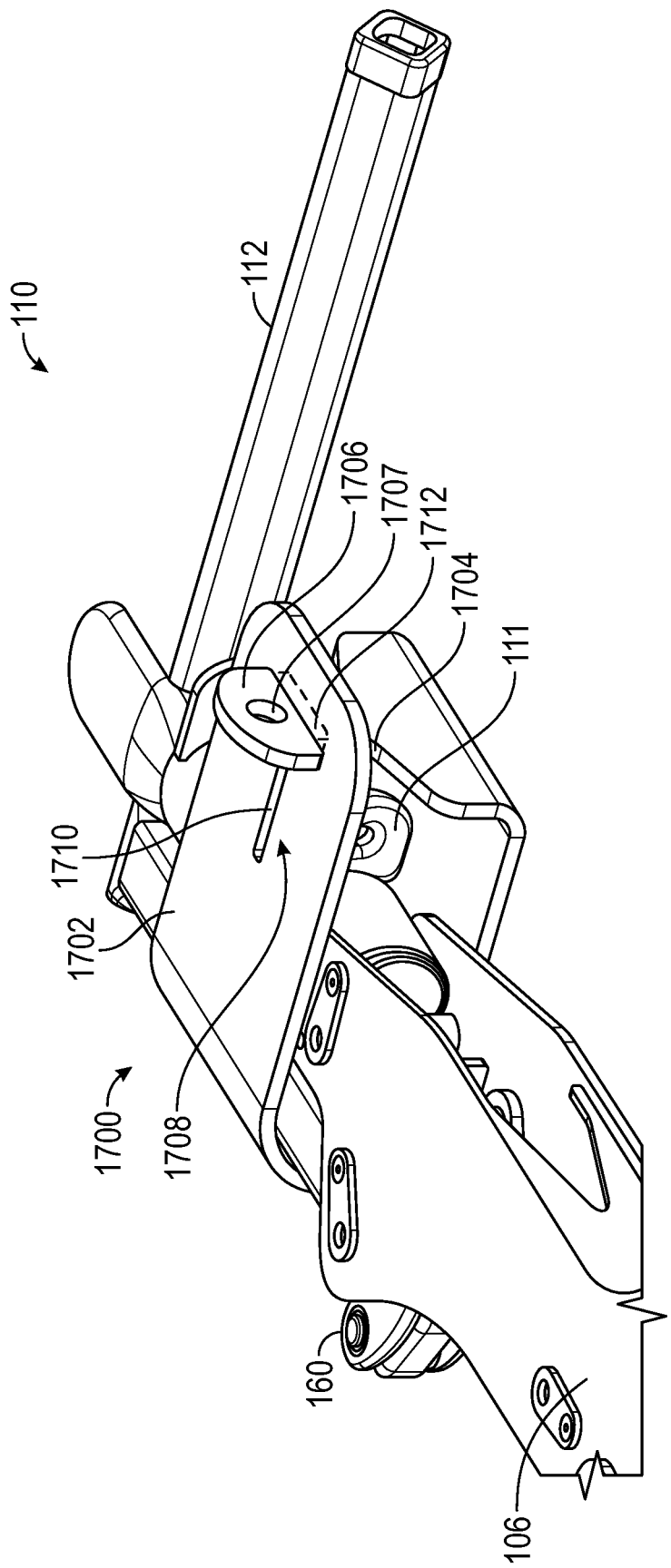
FIGS. 18 and 19 are perspective views of the wheel grid of FIG. 1, including one of the protective belts of FIG. 17.
Figure 19:
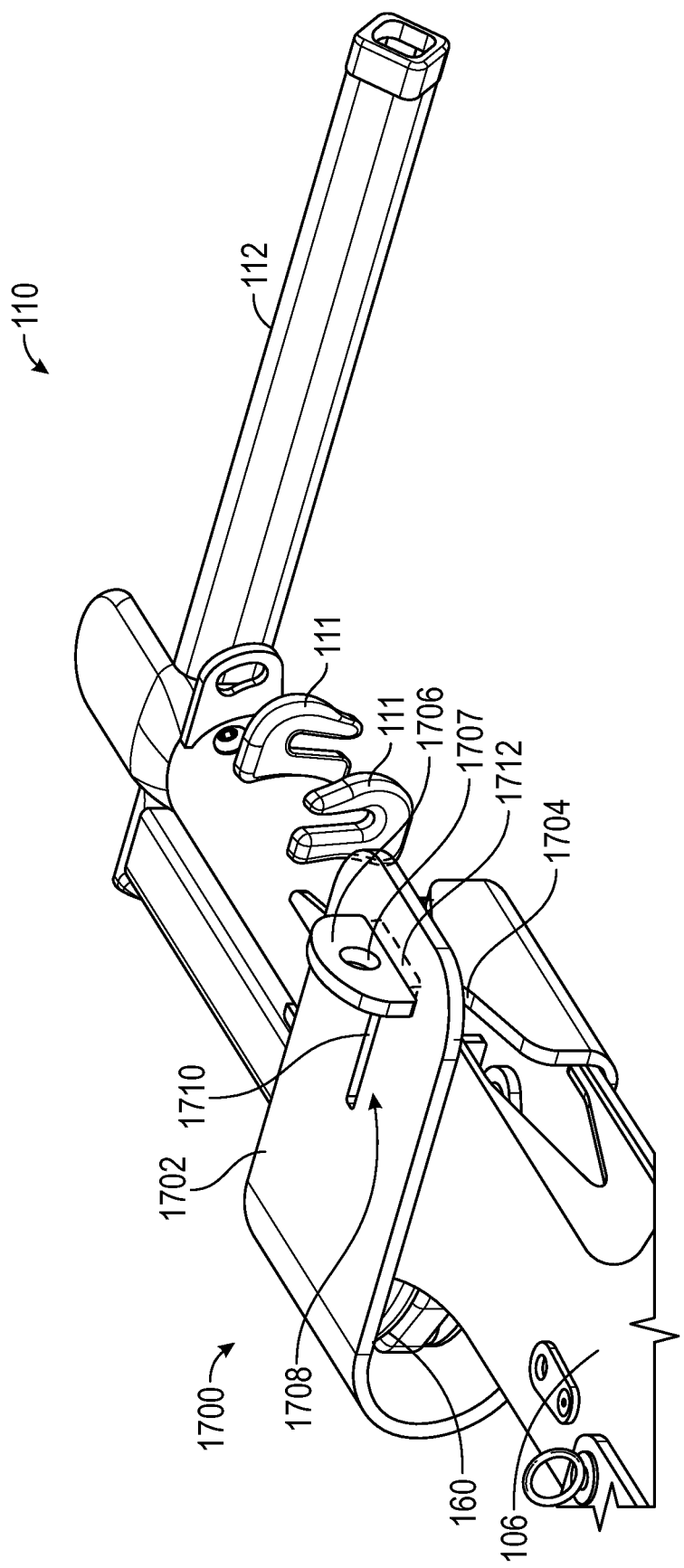

Referring now to FIGS. 17-19, the wheel grid 100 is shown with a protective belt 1700, according to some embodiments. The belt 1700 is positioned around the crossbar 106 and provides a barrier between the crossbar 106 and the bumper 1802 of the towed vehicle 1800. The belt 1700 may be made of a flexible, relatively soft material that may reduce scratches, dents, and other damage to the bumper 1802 that may occur if the bumper 1802 directly contacted the crossbar 106. For example, the belt 1700 may be made from a rubber, plastic, or composite material. The material may also be selected to provide a non-slip surface so that the bumper 1802 does not slide across the crossbar 106, which may further reduce the damage to the bumper. The belt 1700 may also protect the wheel grid 100 itself. For example, as shown in FIG. 19, the belt may be positioned around the L-arm actuator linkages 160, protecting the linkages 160 as well as the crossbar 106 itself from damage caused by lifting the bumper 1802.

When a vehicle 1800 requires a chain lift (e.g., due to damage to the tires 1804), the L-arms 112 are rotated into the stowed position, as shown in FIGS. 17-19. A belt 1700 is then installed on each side of the crossbar 106. The belt 1700 includes an elongated body 1702 long enough to wrap around the crossbar 106. The belt 1700 further includes a narrow portion 1704 that widens to a tab 1706 at one end of the belt 1700. At the other end of the belt 1700 is a slot 1708 sized to receive and retain the tab 1706. The slot 1708 may be, for example, a T-shaped slot with a vertical portion 1710 and a horizontal portion 1712. To install the belt 1700 on the crossbar 106, the belt 1700 is first positioned around the chain hooks 111 near an outer end of the crossbar 106, as shown in FIG. 18. In this area, the crossbar 106 may be relatively narrow, allowing for more room to install belt 1700. Next, the tab 1706 is inserted into the vertical portion 1710 of the slot 1708 by turning the tab end of the belt 1700 ninety degrees from its natural position. Because of the shape and flexible material of the belt 1700, a user may rotate the tab 1706 by hand. Once the tab 1706 has been fully inserted, the tab may be rotated ninety degrees back to its natural position, and the narrow portion 1704 may be moved into the horizontal portion 1712 of the slot 1708. Because the tab 1706 is wider than the horizontal portion 1712 of the slot 1708, the tab 1706 cannot be pulled through the horizontal portion 1712, and the belt 1700 is retained around the crossbar 106. Finally, the belt 1700 can be slid toward the center of the crossbar 106 into an installed position around the linkages 160, as shown in FIG. 19. Because the crossbar 106 is wider in this position, the belt 1700 may fit snugly around the crossbar and be held in place by friction. A second belt 1700 may be installed on the other end of the crossbar 106.

Once the belts 1700 are in the installed position, the tow vehicle can back the wheel grid 100 up to a towed vehicle until the crossbar is roughly aligned with the bumper. Then, a user can install the chain 1720 by coupling a first end of the chain 1720 to the hooks 111 on a first side of the crossbar 106, coupling the chain 1720 to the axle or other structural component of the towed vehicle, and coupling the other side of the chain 1720 to hooks 111 on the other side of the crossbar 106. In some embodiments, separate chains 1720 may be used on each side of the crossbar 106. Once the chains 1720 are installed, the wheel grid 100 can be lifted, causing the chains to lift the vehicle 1800. As shown in FIG. 17, the belts separate the bumper 1802 of the towed vehicle 1800 from the wheel grid, protecting the bumper 1802, the crossbar 106, and the linkages 160 from damage. To remove the belt 1700, the process is reversed. The vehicle is lowered to the ground and the chains 1720 are removed. The belts 1700 are slid toward the end of the crossbar, and the tab 1706 is turned ninety degrees and pulled back through the vertical portion 1710 of the slot 1708. The tab 1706 may include an opening 1707 that can be used to pull the tab 1706 when installing or removing the belt 1700 or can be used to hook the belt 1700 in a storage location.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data that cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the wheel grid 100 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:
1. A wheel grid comprising:
a crossbar configured to be coupled to a boom of a tow vehicle, the crossbar comprising a distal tip; and
an L-arm rotatably coupled to the crossbar at a proximal end of the L-arm and configured to rotate from an engaged position to a stowed position, wherein:
as the L-arm rotates from the engaged position to the stowed position, a distal portion of the L-arm intersects with a vertical line passing through the distal tip of the crossbar;

in the stowed position, the distal portion of the L-arm is positioned laterally inward relative to the distal tip of the crossbar;

the crossbar and the distal portion of the L-arm are configured to cooperatively engage a tire of a towed vehicle to lift a front end or a rear end of the towed vehicle when the distal portion of the L-arm is in the engaged position; and the L-arm is configured to rotate at least 180 degrees.

2. The wheel grid of claim 1, wherein when the distal portion of the L-arm is in the engaged position, the distal portion of the L-arm extends in a direction substantially perpendicular to the crossbar.

3. The wheel grid of claim 1, further comprising a linear actuator coupled to one or more linkages, the linear actuator and the one or more linkages configured to rotate the L-arm.

4. The wheel grid of claim 1, further comprising a plurality of hooks coupled to the crossbar, the plurality of hooks configured to removably couple to one or more chains, wherein when the distal portion of the L-arm is in the stowed position, the crossbar is configured to engage a bumper of a towed vehicle and to lift a front end or a rear end of the towed vehicle cooperatively with the one or more chains.

5. The wheel grid of claim 4, further comprising:
a linear actuator coupled to one or more linkages, the linear actuator and the one or more linkages configured to rotate the L-arm; and
a flexible belt removably coupled to the crossbar and configured to protect the linear actuator and the one or more linkages from contact with the bumper.

6. The wheel grid of claim 1, wherein the crossbar is configured to be rotatably coupled to the boom, wherein the wheel grid further comprises a detent assembly configured to bias the crossbar to a position perpendicular to the boom.

7. A tow vehicle comprising:
a frame;
a boom coupled to the frame and extending rearward from the frame; and
a wheel grid rotatably coupled to the boom by a rotation pin, the wheel grid comprising:
a crossbar coupled to the boom, the crossbar comprising a first distal tip; and
an L-arm rotatably coupled to the crossbar at a proximal end of the L-arm and configured to rotate from an engaged position to a stowed position, wherein:
as the L-arm rotates from the engaged position to the stowed position, a distal portion of the L-arm intersects with a vertical line passing through the first distal tip of the crossbar;
in the stowed position, the distal portion of the L-arm is positioned laterally inward relative to the first distal tip of the crossbar; and
the wheel grid is configured to rotate at least 180 degrees about the rotation pin.

8. The tow vehicle of claim 7, further comprising a detent assembly coupled to the crossbar and configured to resist the rotation of the wheel grid relative to the boom when the crossbar is substantially perpendicular to the boom.

9. The tow vehicle of claim 8, wherein the boom includes a distal end comprising a detent flat, and the detent assembly includes a detent bracket biased towards the boom and configured to engage the detent flat when the crossbar is substantially perpendicular to the boom.

10. The tow vehicle of claim 9, wherein the detent bracket is slidably coupled to two fasteners, the two fasteners coupled to the crossbar, and wherein the detent assembly further includes two springs, each spring positioned around one of the two fasteners and configured to bias the detent bracket towards the boom.

11. The tow vehicle of claim 10, wherein the boom comprises a stop configured to contact a head of one of the two fasteners to restrict the rotation of the wheel grid.

12. The tow vehicle of claim 9, wherein the distal end of the boom comprises a left portion with a rounded profile and a right portion with a rounded profile, wherein the detent assembly is configured to contact the right portion or the left portion when the crossbar is not substantially perpendicular to the boom.

13. A wheel grid assembly comprising:
a boom configured to be coupled to a tow vehicle; and
a wheel grid coupled to the boom, the wheel grid comprising:
a crossbar coupled to the boom; and
an L-arm rotatably coupled to the crossbar at a proximal end of the L-arm and configured to rotate from an engaged position to a stowed position, wherein, in the stowed position, a distal portion of the L-arm intersects a distal end of the crossbar when viewed from above; and
a linear actuator coupled to the crossbar and linkage, the linkage further coupled to the L-arm, wherein retraction of the linear actuator is configured to cause the L-arm to rotate to the stowed position and extension of the linear actuator is configured to rotate the L-arm away from the stowed position,
wherein the linear actuator is configured to rotate the L-arm at least 180 degrees.

14. The wheel grid assembly of claim 13, wherein the linear actuator is configured to be positioned substantially within a footprint of the crossbar when the L-arm is in the stowed position.

15. The tow vehicle of claim 13, wherein the linear actuator is configured to position and maintain the L-arm in a plurality of intermediate rotational positions to allow the L-arm and the crossbar to cooperative engage towed vehicle tires of varying diameter.

16. A tow vehicle comprising:
a frame;
a boom coupled to the frame and extending rearward from the frame, the boom including a distal end comprising a detent flat;
a wheel grid rotatably coupled to the boom by a rotation pin, the wheel grid comprising:
a crossbar coupled to the boom, the crossbar comprising a first distal tip; and
an L-arm rotatably coupled to the crossbar at a proximal end of the L-arm and configured to rotate from an engaged position to a stowed position; and
a detent assembly coupled to the crossbar, the detent assembly including a detent bracket biased towards the boom and configured to engage the detent flat when the crossbar is substantially perpendicular to the boom, wherein:
as the L-arm rotates from the engaged position to the stowed position, a distal portion of the L-arm intersects with a vertical line passing through the first distal tip of the crossbar;
in the stowed position, the distal portion of the L-arm is positioned laterally inward relative to the first distal tip of the crossbar; and
the detent assembly is configured to resist the rotation of the wheel grid relative to the boom when the crossbar is substantially perpendicular to the boom.

17. The tow vehicle of claim 16, wherein the detent bracket is slidably coupled to two fasteners, the two fasteners coupled to the crossbar, and wherein the detent assembly further includes two springs, each spring positioned around one of the two fasteners and configured to bias the detent bracket towards the boom.

18. The tow vehicle of claim 17, wherein the boom comprises a stop configured to contact a head of one of the two fasteners to restrict the rotation of the wheel grid.

19. The tow vehicle of claim 16, wherein the distal end of the boom comprises a left portion with a rounded profile and a right portion with a rounded profile, wherein the detent assembly is configured to contact the right portion or the left portion when the crossbar is not substantially perpendicular to the boom.

\* \* \* \* \*